US009543590B2

(12) United States Patent
Kim et al.

(10) Patent No.: US 9,543,590 B2
(45) Date of Patent: Jan. 10, 2017

(54) CATALYST LAYER COMPOSITION FOR FUEL CELL, ELECTRODE FOR FUEL CELL, METHOD OF PREPARING ELECTRODE FOR FUEL CELL, MEMBRANE-ELECTRODE ASSEMBLY FOR FUEL CELL, AND FUEL CELL SYSTEM USING THE MEMBRANE-ELECTRODE ASSEMBLY

(75) Inventors: Tae-Yoon Kim, Yongin-si (KR); Sang-Il Han, Yongin-si (KR); Sung-Yong Cho, Yongin-si (KR); Hee-Tak Kim, Yongin-si (KR); Kah-Young Song, Yongin-si (KR); Myoung-Ki Min, Yongin-si (KR); Geun-Seok Chai, Yongin-si (KR)

(73) Assignee: Kolon Industries Inc., Kolon-ro, Gwacheon-si, Gyeonggi-do (KR)

( * ) Notice: Subject to any disclaimer, the term of this patent is extended or adjusted under 35 U.S.C. 154(b) by 57 days.

(21) Appl. No.: 13/571,694

(22) Filed: Aug. 10, 2012

(65) Prior Publication Data
US 2013/0040222 A1    Feb. 14, 2013

(30) Foreign Application Priority Data
Aug. 11, 2011  (KR) .................. 10-2011-0080273

(51) Int. Cl.
*H01M 4/08*    (2006.01)
*H01M 4/86*    (2006.01)
(Continued)

(52) U.S. Cl.
CPC ......... *H01M 4/8605* (2013.01); *H01M 4/8668* (2013.01); *H01M 8/1007* (2016.02);
(Continued)

(58) Field of Classification Search
None
See application file for complete search history.

(56) References Cited

U.S. PATENT DOCUMENTS 6,746,793 B1 *  6/2004  Gyoten ............... H01M 4/8605
                                                              429/481
6,998,149 B2    2/2006  Kohler et al.
(Continued)

FOREIGN PATENT DOCUMENTS

JP    2003-297373 A    10/2003
JP    2006216559         8/2006
(Continued)

OTHER PUBLICATIONS

Notice of Allowance issued by Korean Patent Office dated Aug. 21, 2013 corresponding to KR10-2011-0080273 and Request for Entry of the Accompanying Office Action attached herewith.
(Continued)

*Primary Examiner* — Scott J Chmielecki
(74) *Attorney, Agent, or Firm* — Robert E. Bushnell, Esq.

(57) ABSTRACT

A catalyst layer composition for a fuel cell includes an ionomer cluster, a catalyst, and a solvent including water and polyhydric alcohol; and an electrode for a fuel cell includes a catalyst layer comprising an ionomer cluster having a three-dimensional reticular structure, and a catalyst, a method of preparing a electrode for a fuel cell includes a catalyst layer comprising an ionomer cluster having a three-dimensional reticular structure, and a catalyst, and a membrane-electrode assembly for a fuel cell including the electrode and a fuel cell system including the membrane-electrode assembly.

17 Claims, 8 Drawing Sheets

(51) Int. Cl.
*H01M 8/10* (2016.01)
*H01M 4/92* (2006.01)

(52) U.S. Cl.
CPC .......... *H01M 8/1018* (2013.01); *H01M 4/921* (2013.01); *H01M 4/926* (2013.01); *H01M 2008/1095* (2013.01); *Y02E 60/522* (2013.01); *Y02P 70/56* (2015.11)

(56) References Cited

U.S. PATENT DOCUMENTS

| | | | |
|---|---|---|---|
| 7,169,500 B2 | 1/2007 | Kim et al. | |
| 7,201,993 B2 | 4/2007 | Uchida et al. | |
| 7,232,624 B2 | 6/2007 | Kim | |
| 7,419,740 B2 | 9/2008 | Binder et al. | |
| 2004/0170885 A1* | 9/2004 | Gyoten | H01M 4/8605 429/480 |
| 2004/0247975 A1* | 12/2004 | Song | H01M 4/926 429/483 |
| 2006/0177726 A1 | 8/2006 | Kim et al. | |
| 2007/0269699 A1* | 11/2007 | Pak | H01M 4/8657 429/483 |
| 2007/0270305 A1 | 11/2007 | Pak et al. | |
| 2008/0292942 A1* | 11/2008 | You | H01M 4/881 429/482 |
| 2009/0087549 A1* | 4/2009 | Zhou | H01M 4/8817 427/115 |
| 2010/0087309 A1* | 4/2010 | Kwon | H01M 8/1004 502/101 |
| 2010/0163153 A1* | 7/2010 | Almeida Ribeiro Claro | B27N 3/00 156/62.2 |
| 2010/0330453 A1* | 12/2010 | Han | H01M 8/1039 429/483 |
| 2011/0014542 A1* | 1/2011 | Sumida | D01D 5/0061 429/480 |
| 2013/0288882 A1* | 10/2013 | Min | H01M 4/926 502/5 |

FOREIGN PATENT DOCUMENTS

| | | |
|---|---|---|
| JP | 2010129457 | 6/2010 |
| KR | 10-2002-0010544 A | 2/2002 |
| KR | 10-2002-0029313 A | 4/2002 |
| KR | 10-2002-0042702 A | 6/2002 |
| KR | 10-2003-0073763 A | 9/2003 |
| KR | 10-2005-0098658 A | 10/2005 |
| KR | 10-2008-0039034 * | 5/2008 |

OTHER PUBLICATIONS

Korean Office Action dated Apr. 29, 2013 issued by KIPO which claims Korean Patent Application No. 10-2011-0080273 and Request for Entry of the Accompanying Office Action attached herewith.

N. P. Lebedeva et al., Sibunit Carbon-Based Cathodes for Proton-Exchange-Membrane Fuel Cells, Fuel Cell, vol. 9, pp. 439-452 (Jul. 2, 2009). Cited in Korean Office Action dated Apr. 29, 2013 issued by KIPO which claims Korean Patent Application No. 10-2011-0080273.

* cited by examiner

CATALYST LAYER COMPOSITION FOR FUEL CELL, ELECTRODE FOR FUEL CELL, METHOD OF PREPARING ELECTRODE FOR FUEL CELL, MEMBRANE-ELECTRODE ASSEMBLY FOR FUEL CELL, AND FUEL CELL SYSTEM USING THE MEMBRANE-ELECTRODE ASSEMBLY

CLAIM OF PRIORITY

This application makes reference to, incorporates the same herein, and claims all benefits accruing under 35 U.S.C. §119 from an application for CATALYST LAYER COMPOSITION FOR FUEL CELL, ELECTRODE FOR FUEL CELL, METHOD OF PREPARING ELECTRODE FOR FUEL CELL, MEMBRANE-ELECTRODE ASSEMBLY FOR FUEL CELL, AND FUEL CELL SYSTEM USING THE SAME earlier filed in the Korean Intellectual Property Office on 11 Aug. 2011 and there duly assigned Serial No. 10-2011-0080273.

BACKGROUND OF THE INVENTION

Field of the Invention

The present invention relates to a catalyst layer composition for a fuel cell and an electrode for a fuel cell using the same, a method of preparing an electrode for a fuel cell, a membrane-electrode assembly for a fuel cell, and a fuel cell system using the membrane-electrode assembly.

Description of the Related Art

A fuel cell is a power generation system for producing electrical energy through a chemical reaction of oxidant and hydrogen in a hydrocarbon-based, material such as methanol, ethanol, or a natural gas.

Such a fuel cell is a clean energy source with the potential to replace fossil fuels. A fuel cell includes a stack composed of unit cells, and produces various ranges of power. Since the fuel cell has about four to about ten times higher energy density than a small lithium battery, it has been highlighted as a small portable power source.

Typical examples of fuel cells are polymer electrolyte membrane fuel cells (PEMFC) and direct oxidation fuel cells (DOFC). A direct oxidation fuel cell that uses methanol as a fuel is called a direct methanol fuel cell (DMFC).

A polymer electrolyte membrane fuel cell (PEMFC) has an advantage of high energy density and high power, but it has problems in the need to carefully handle hydrogen gas and the requirement of accessory facilities, such as a fuel reforming processor for reforming methane, methanol, natural gas, and the like, in order to produce hydrogen as the fuel gas.

On the contrary, a direct oxidation fuel cell (DOFC) has lower energy density than that of the polymer electrolyte membrane fuel cell, but the direct oxidation fuel cell has advantages of easy handling of a fuel, being capable of operating at room temperature due to its low operation temperature, and the direct oxidation fuel cell does not need additional fuel reforming processors.

In the above-mentioned fuel cell system, the stack that generates electricity substantially includes several scores of unit cells stacked adjacent to one another, and each unit cell is formed of a membrane-electrode assembly (MEA) and a separator (also referred to as a bipolar plate). The membrane-electrode assembly (MEA) is composed of an anode (also referred to as a "fuel electrode" or an "oxidation electrode") and a cathode (also referred to as an "air electrode" or a "reduction electrode") those are separated by a polymer electrolyte membrane.

A fuel is supplied to an anode and adsorbed on catalysts of the anode, and the fuel is oxidized to produce protons and electrons. The electrons are transferred into a cathode via an external circuit, and the protons are transferred into the cathode through the polymer electrolyte membrane. In addition, an oxidant is supplied to the cathode, and then the oxidant, protons, and electrons are reacted on catalysts of the cathode to produce electricity along with water.

SUMMARY OF THE INVENTION

One embodiment of the present invention provides a catalyst layer composition for a fuel cell increasing the utilization rate of a catalyst and improving performance of a fuel cell.

Another embodiment of the present invention provides an electrode for a fuel cell using the catalyst layer composition for a fuel cell.

Yet another embodiment of the present invention provides a method of preparing an electrode for a fuel cell.

Still another embodiment of the present invention provides a membrane-electrode assembly for a fuel cell including the electrode for a fuel cell.

Further embodiment of the present invention provides a fuel cell system including the membrane-electrode assembly for a fuel cell.

According to one embodiment of the present invention, provided is a catalyst layer composition for a fuel cell that includes an ionomer cluster; a catalyst; and a solvent including water and polyhydric alcohol.

The ionomer cluster has an average size ranging from about 100 nm to about 300 nm.

The ionomer cluster may include a fluorine-based polymer, a benzimidazole-based polymer, a polyimide-based polymer, a polyetherimide-based polymer, a polyphenylenesulfide-based polymer, a polysulfone-based polymer, a polyethersulthne-based polymer, a polyetherketone-based polymer, a polyether-etherketone-based polymer, a polyphenylquinoxaline-based polymer, or a combination thereof.

The catalyst may be included in an amount of about 125 parts to about 250 parts by weight based on 100 parts by weight of the ionomer cluster.

The polyhydric alcohol may include $C_1$ to $C_6$ alkane substituted with 2 to 4 hydroxy groups or $C_1$ to $C_6$ haloalkane substituted with 2 to 4 hydroxy groups and in particular, 1,2-ethanediol, 1,2-propanediol, 1,3-propanediol, 3-chloro-1,2-propanediol, 2-chloro-1,3-propanediol, dipropylene glycol, glycerine, or a combination thereof.

The water may be included in an amount of about 20 volume % to about 60 volume % based on the total amount of the solvent.

According to another embodiment of the present invention, provided is an electrode for a fuel cell including an electrode substrate; a catalyst layer disposed on the electrode substrate, and the catalyst layer include an ionomer cluster having a three-dimensional reticular structure and a catalyst adsorbed on the surface of the ionomer cluster.

According to yet another embodiment of the present invention, provided is a method of preparing an electrode for a fuel cell which includes preparing an ionomer solution by dissolving ionomer powder in polyhydric alcohol; adding a catalyst to the ionomer solution; preparing a catalyst layer composition by adding water to the ionomer solution including the catalyst; and coating the catalyst layer composition on an electrode substrate and drying the coated electrode substrate under vacuum to form a catalyst layer on the electrode substrate.

The water may be included in an amount of about 20 volume % to about 60 volume % based on the total amount of the water and the polyhydric alcohol.

The drying may be performed at a temperature ranging from about 50° C. to about 100° C., may be performed under a vacuum degree ranging from about 10 torr to about 760 torr, or may be performed for about 1 hour to about 3 hours.

According to still another embodiment of the present invention, provided is a membrane-electrode assembly for a fuel cell that includes an anode and a cathode facing each other; a polymer electrolyte membrane interposed between the cathode and the anode; and wherein the cathode and the anode respectively includes an electrode substrate and a catalyst layer disposed on the electrode substrate and provided with the catalyst layer composition, wherein the catalyst layer includes an ionomer cluster having a three-dimensional reticular structure and a catalyst adsorbed on the surface of the ionomer cluster.

According to further embodiment of the present invention, provided is a fuel cell system that includes at least one electrical generating element including the membrane-electrode assembly for a fuel cell and separators positioned at each side of the membrane-electrode assembly, at least one electrical generating element for generating electrical energy through an oxidation of a fuel and a reduction of an oxidant; a fuel supplier for supplying the fuel to the electrical generating element; and an oxidant supplier for supplying the oxidant to the electrical generating element.

Hereinafter, further embodiments will be described in detail.

The catalyst layer composition has high dispersion between an ionomer cluster and a catalyst and optimizes an interface condition therebetween in an electrode and thus, realizes a fuel cell with improved performance.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
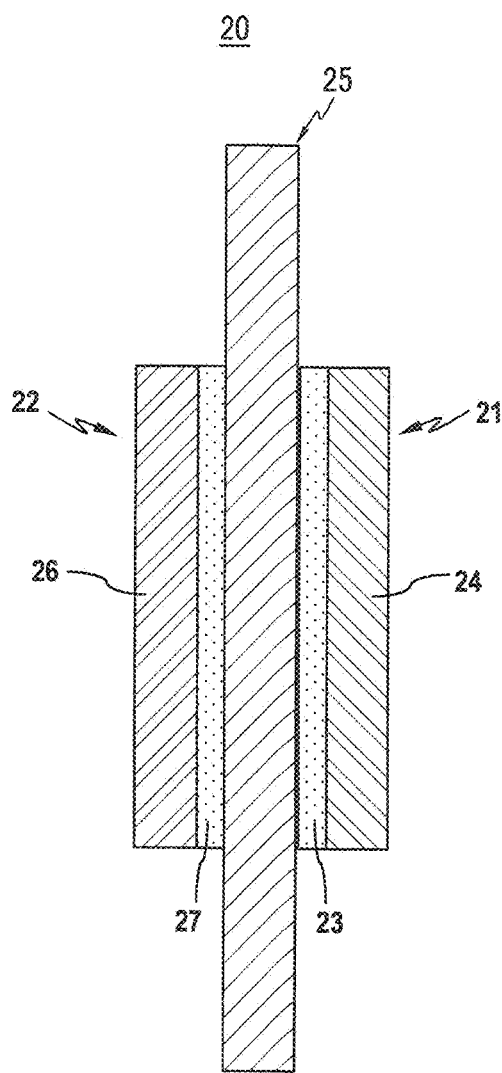
FIG. 1 is a schematic view of a membrane-electrode assembly (MEA) for a fuel cell according to one embodiment of the present invention.

The general inventive concept is described more fully hereinafter, in which exemplary embodiments are shown. The disclosed embodiments may be embodied in many different forms, all without departing from the spirit or scope of the present invention. The present invention is not construed as limited to the exemplary embodiments set forth herein. Accordingly, the drawings and description are to be regarded as illustrative in nature to explain aspects of the present invention.

According to one embodiment of the present invention, the catalyst layer composition for a fuel cell includes an ionomer cluster, a catalyst, and a solvent.

The ionomer cluster may convert an ionomer cluster having a three-dimensional reticular structure in the catalyst layer. The three-dimensional reticular structure refers to a state in which ionomer polymers are entangled with each other in a three-dimensional form.

The ionomer cluster may include a proton conductive polymer as a binder, and specifically a proton conductive polymer having a cation exchange group selected from a sulfonic acid group, a carboxylic acid group, a phosphoric acid group, a phosphonic acid group and a derivative thereof, at a side chain of the ionomer cluster.

Specific example of the proton conductive polymer may include a fluorine-based polymer, a benzimidazole-based polymer, a polyimide-based polymer, a polyetherimide-based polymer, a polyphenylenesulfide-based polymer, a polysulfone-based polymer, a polyethersulfone-based polymer, a polyetherketone-based polymer, a polyetheretherketone-based polymer, a polyphenylquinoxaline-based polymer, and the like. These proton conductive polymers may be used singularly or as a mixture of two or more.

More specific examples of the proton conductive polymer may include poly(perfluorosulfonic acid); poly(perfluorocarboxylic acid); a copolymer of tetrafluoroethylene having a sulfonic acid group and fluorovinylether; defluorinated polyetherketone sulfide; aryl ketone; poly (2,2'-(m-phenylene)-5,5'-benzimidazole); poly (2,5-benzimidazole), and the like. These may be used singularly or as a mixture of two or more.

The hydrogen (H) in the cation exchange group positioned at a side chain of the proton conductive polymer may be substituted with Na, K, Li, Cs, or tetrabutylammonium. When hydrogen in a cation exchange group is substituted with sodium, sodium hydroxide (NaOH) may be used, and when hydrogen in a cation exchange group is substituted with tetrabutylammonium, tetrabutylammonium hydroxide may be used. When hydrogen in a cation exchange group is substituted with potassium, lithium, or cesium, suitable compounds for the substitutions may be used. Since such a substitution is known to this art, a detailed description thereof is omitted.

The ionomer cluster may be used singularly or as a mixture. Optionally, the ionomer cluster may be used along with a non-conductive compound to improve adherence with a polymer electrolyte membrane. The use amount of the non-conductive compound may be adjusted to its usage purpose.

Examples of the non-conductive compound may include polytetrafluoroethylene, a tetrafluoroethylene-hexafluoropropylene copolymer, a tetrafluoroethylene-perfluoroalkylvinylether copolymer, an ethylene-tetrafluoroethylene copolymer, an ethylene-chlorotrifluoroethylene copolymer, a polyvinylidenefluoride, polyvinylidenefluoride-hexafluoropropylene copolymer, dodecylbenzenesulfonic acid, sorbitol, and the like. These may be used singularly or as a mixture of two or more.

In the catalyst layer composition, the ionomer cluster may have an average size ranging from about 100 nm to about 300 nm and in particular, from 150 nm to about 300 nm. When the ionomer cluster has an average size within the range, it may have a maximized interface area with the catalyst, which may stabilize power of an electrode and improve cell performance.

The catalyst may be dispersed on the surface of the ionomer cluster in the catalyst layer composition.

The catalyst may be generally-used catalyst used in a cathode and an anode, for example platinum, ruthenium, osmium, a platinum/ruthenium alloy, a platinum/osmium alloy, a platinum/palladium alloy, a platinum/M alloy (M is a transition element of Ga, Ti, V, Cr, Mn, Fe, Co, Ni, Cu, Zn, Sn, Mo, W, Rh, Ru, or a combinations thereof), or a combinations thereof. Specific examples of the catalyst may include Pt, Pt/Ru, Pt/W, Pt/Ni, Pt/Sn, Pt/Mo, Pt/Pd, Pt/Fe, Pt/Cr, Pt/Co, Pt/Ru/W, Pt/Ru/Mo, Pt/Ru/V, Pt/Fe/Co, Pt/Ru/Rh/Ni, Pt/Ru/Sn/W, or combinations thereof, but are not limited thereto. Such a catalyst may be used in a form of a metal itself (black catalyst), or may be used by being supported on a carrier.

The catalyst may be included in an amount of about 125 parts to about 250 parts by weight and in particular, about 150 parts to about 250 parts by weight based on 100 parts by weight of the ionomer cluster. When the catalyst is used within the range, it may have an increased utilization rate and thus, improve performance of an electrode for a fuel cell.

The solvent may be a mixed solvent of water and polyhydric alcohol.

The polyhydric alcohol may include $C_1$ to $C_6$ alkane substituted with 2 to 4 hydroxy groups, $C_1$ to $C_6$ haloalkane substituted with 2 to 4 hydroxy groups, or combinations thereof.

Examples of the polyhydric alcohol may include 1,2-ethanediol, 1,2-propanediol, 1,3-propanediol, 3-chloro-1,2-propanediol, 2-chloro-1,3-propanediol, dipropylene glycol, glycerine, or combinations thereof and in one embodiment, dipropylene glycol is preferable.

The water may be used in an amount of about 20 volume % to about 60 volume % based on the total amount of the solvent.

According to another embodiment of the present invention, an electrode for a fuel cell may include an electrode substrate and a catalyst layer formed on the surface of the electrode substrate.

The catalyst layer is formed of a catalyst layer composition for a fuel cell and includes an ionomer cluster having a three-dimensional reticular structure and a catalyst adsorbed on the surface of the ionomer cluster. The three-dimensional reticular structure refers to a state in which ionomer polymers are entangled with each other in a three-dimensional form.

The electrode substrate supports an anode and a cathode and provides a path for transferring a fuel and oxidant to catalyst layers. In one embodiment, the electrode substrates is formed from a material such as carbon paper, carbon cloth, carbon felt, or a metal cloth (a porous film composed of a metal fiber or a metal film disposed on a surface of a cloth composed of polymer fibers). The electrode substrate is not limited thereto.

The electrode substrate may be treated with a fluorine-based resin to be water-repellent to prevent deterioration of reactant diffusion efficiency due to water generated during operation of a fuel cell.

Examples of the fluorine-based resin may include polytetrafluoroethylene, polyvinylidene fluoride, polyhexafluoropropylene, polyperfluoroalkylvinylether, polyperfluorosulfonylfluoride, alkoxyvinyl ether, fluorinated ethylene propylene, polychlorotrifluoroethylene, or a copolymer thereof.

The ionomer cluster and the catalyst included in the catalyst layer are the same as described in a catalyst layer composition for a fuel cell according to one embodiment of the present invention.

The ionomer cluster has a three-dimensional reticular structure and a maximized interface with the catalyst, improving cell performance.

The electrode for a fuel cell may further include a microporous layer to increase reactant diffusion effects of the electrode substrate. The microporous layer generally includes conductive powders with a particular particle diameter, for example carbon powder, carbon black, acetylene black, activated carbon, carbon fiber, fullerene, carbon nanotube, carbon nano wire, carbon nano-horn, or carbon nano ring.

Hereinafter, a method of preparing an electrode for a fuel cell using the catalyst layer composition is illustrated in detail.

Conventionally, an electrode is fabricated by using slurries prepared in a method without retreating an ionomer dispersion solution. This conventional method mixes the ionomer dispersion solution with a catalyst powder and/or a co-solvent of water and alcohol to control a viscosity. The ionomer dispersion solution may be a commercially available one including water, or a mixture of water and 1-propanol, but ionomer is not well dispersed therein. The reason is that ionomer does not have appropriately solubility to water, alcohols, or a mixture thereof. Accordingly, when this conventionally-prepared ionomer dispersion solution is used to form a catalyst layer included in an electrode for a fuel cell, the ionomer may not be well dispersed in the catalyst layer. Therefore, deterioration of a catalyst utilization rate in an electrode downs to about 30% or less. In addition, this deterioration may not secure uniform activity of an electrode in various manufacturing methods and thus, brings big performance deviation.

On the contrary, an electrode for a fuel cell according to the one embodiment of the present invention may be fabricated in the following method.

An electrode for a fuel cell may be fabricated by dissolving ionomer powder in polyhydric alcohol to prepare an ionomer solution (S1); adding a catalyst to the ionomer solution (S2); adding water to the ionomer solution including the catalyst to prepare a catalyst layer composition (S3);

and coating the catalyst layer composition on an electrode substrate and vacuum-drying the coated electrode substrate to form a catalyst layer (S4).

The ionomer powder may be an ionomer powder in the form of solid type or a commercially-available ionomer dispersion liquid in the form of liquid type. Alternatively, the ionomer powder prepared by freeze-drying the ionomer dispersion liquid, may be used. The commercial ionomer dispersion liquid may mainly include water and 1-propyl-alcohol as a solvent. The ionomer powder may be agglomerate and has a relatively larger size than a catalyst particle.

First of all, ionomer powder is dissolved in polyhydric alcohol to prepare an ionomer solution including ionomer cluster (S1). The polyhydric alcohol may be $C_1$ to $C_6$ alkane substituted with 2 to 4 hydroxy groups or $C_1$ to $C_6$ haloalkane substituted with 2 to 4 hydroxy groups. For example, the polyhydric alcohol may be selected from the group consisting of 1,2-ethanediol, 1,2-propanediol, 1,3-propanediol, 3-chloro-1,2-propanediol, 2-chloro-1,3-propanediol, dipropylene glycol, glycerine, and a combinations thereof. The polyhydric alcohol may be preferably dipropylene glycol.

Next, a catalyst is added to the ionomer solution including the ionomer cluster (S2). The catalyst may be attached to the surface of an ionomer cluster. The catalyst may be added in an amount of about 125 parts to about 250 parts by weight based on 100 parts by weight of the solid content of the ionomer solution. When the catalyst is included within the above range, the ionomer cluster prepared in the step (S1) has a larger surface area than ionomer in a commercially-available ionomer dispersion liquid and thus, the ionomer cluster may have a maximum interface with the catalyst. When a commercially-available ionomer dispersion liquid is used to form a catalyst layer, the ionomer agglomerates cover catalyst particles to be thick as well as limitedly form an interface with a catalyst and thus, decrease a catalyst reaction area.

Then, water is added to the ionomer solution including the catalyst, preparing a catalyst layer composition (S3).

In the catalyst layer composition, water may be included in an amount of about 20 volume % to about 60 volume % based on the total amount of the water and polyhydric alcohol. When water included within the above range based on the total amount of the water and polyhydric alcohol in the catalyst layer composition, it may control the size of an ionomer cluster in the catalyst layer composition. In other words, when water is included in an amount of about 20 volume % to about 60 volume % based on the total amount of the water and polyhydric alcohol, an ionomer cluster in the solvent may have an average size of about 100 nm to about 300 nm. The spherical ionomer cluster is slowly formed, when water is added to ionomer dissolved in polyhydric alcohol. As the amount of water increases, the size of ionomer cluster increases. Therefore, by controlling an amount of water, the size of the ionomer cluster may be controlled. In the catalyst layer composition, polyhyric alcohol may be included in an amount of about 80 volume % to about 40 volume % based on the total amount of the water and polyhydric alcohol. On the other hand, when the solvent includes an excessive amount of polyhydric alcohol, the ionomer cluster is formed to be excessively small and thus, an electrode for a fuel cell with an excessive increase in a density may be formed, resulting in a deterioration of fuel cell performance. Accordingly, when the mixed solvent includes water within the range, the electrode may maximize performance of a fuel cell.

The ionomer cluster may have an average size ranging from about 100 nm to about 300 nm. The ionomer cluster may be measured regarding average size by using a dynamic light scattering spectrometer (DLS). The method of measuring the average size of the ionomer cluster is well known to a person of an ordinary skill in the art and will not be described in detail. When the ionomer cluster has an average size within the above range, the ionomer cluster may have a maximum surface area. Accordingly, an electrode for a fuel cell including a catalyst layer according to one embodiment of the present invention may minimize the use of a platinum-based noble metal used as a catalyst.

Then, the catalyst layer composition is coated on an electrode substrate and vacuum-dried to form a catalyst layer for a fuel cell (S4). During the vacuum-drying, an ionomer cluster having the three-dimensional reticular structure is formed.

Herein, the catalyst layer composition may be coated in various methods such as screen printing, slot dying, tape casting, and the like but is not limited thereto.

The drying process may be performed at a temperature ranging from about 50° C. to about 100° C. and in particular, about 60° C. to about 80° C., for about 1 hour to about 3 hours under a vacuum degree of about 10 torr to about 760 torr. When the drying is processed within the above vacuum degree range, the drying may be rapidly performed, minimizing a damage on a fine structure of a catalyst layer.

The membrane-electrode assembly is described in detail with reference to FIG. 1 as follows.

FIG. 1 is a schematic view of a membrane-electrode assembly (MEA) for a fuel cell according to one embodiment of the present invention.

As shown in FIG. 1, a membrane-electrode assembly for a fuel cell 20 includes a polymer electrolyte membrane 25 and a cathode 21 and an anode 22 positioned on both sides of the polymer electrolyte membrane 25 and the cathode 21 and the anode 22 include electrode substrates 24, 26 and catalyst layers 23, 27, respectively.

The polymer electrolyte membrane 25 may include any kind of materials generally used for a fuel cell. The polymer electrolyte membrane 25 may be formed of a polymer resin and has proton conductivity without any particular limit. Examples of the polymer resin may include a polymer resin having a cation exchange group selected from a sulfonic acid group, a carboxylic acid group, a phosphoric acid group, a phosphonic acid group, and a derivative thereof, at the side chain.

Examples of the polymer resin may include at least one selected from a fluorine-based polymer, a benzimidazole-based polymer, a polyimide-based polymer, a polyetherimide-based polymer, a polyphenylenesulfide-based polymer, polysulfone-based polymer, a polyethersulfone-based polymer, polyetherketone-based polymer, a polyether-etherketone-based polymer, and a polyphenylquinoxaline-based polymer, and more specifically poly(perfluorosulfonic acid) (generally, commercially available as Nafion), poly(perfluorocarboxylic acid), a copolymer of tetrafluoroethylene having a sulfonic acid group and fluorovinylether, defluorinated polyetherketone sulfide, aryl ketone, poly(2,2'-(m-phenylene)-5,5'-bibenzimidazole, poly (2,5-benzimidazole), and the like.

The fuel cell system including the membrane-electrode assembly includes at least one electrical generating element, a fuel supplier, and an oxidant supplier.

The electrical generating element includes the membrane-electrode assembly and a separator (called to be a bipolar plate) and plays a role of generating electricity through electrochemical reaction of a fuel and an oxidant.

The fuel supplier supplies the electrical generating element with a fuel, and the oxidant supplier supplied the electrical generating element with an oxidant. The fuel may include a hydrocarbon fuel such as a fuel including hydrogen or methanol, ethanol, propanol, and the like. The oxidant may include air or oxygen.

Figure 2:
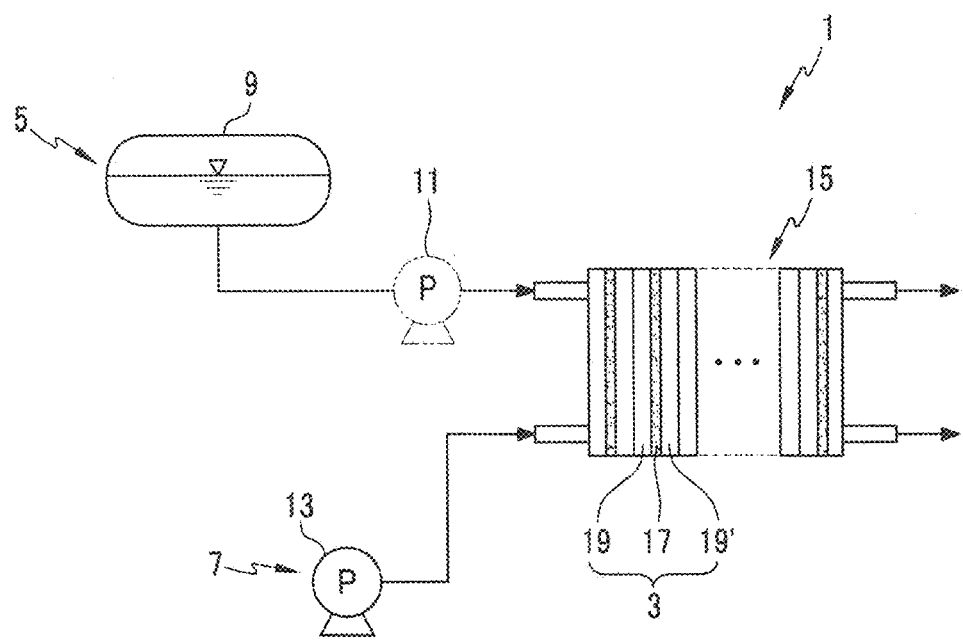
FIG. 2 is a schematic view of a fuel cell system according to one embodiment of the present invention.

FIG. 2 is a schematic view of a fuel cell system, which will be described in details with the reference to this accompanying drawing as follows.

FIG. 2 shows a schematic structure of a fuel cell system according to the embodiment of the present invention.

FIG. 2 shows a fuel cell system supplying a fuel and an oxidant to an electrical generating element using pumps, but the fuel cell system is not limited to such structures. The fuel cell system of the embodiment of the present invention alternately includes a structure wherein a fuel and an oxidant are provided in a diffusion manner without a pump.

The fuel system 1 includes at least one electricity generating element 3 that generates electrical energy by oxidation of a fuel and reduction of an oxidant, a fuel supplier 5 for supplying the fuel, and an oxidant supplier 7 for supplying an oxidant to the electricity generating element 3.

In addition, the fuel supplier 5 is equipped with a tank 9, which stores fuel, and a fuel pump 11, which is connected therewith. The fuel pump 11 supplies fuel that is stored in the tank 9 with a predetermined pumping power.

The oxidant supplier 7, which supplies the electricity generating element 3 with an oxidant, is equipped with at least one oxidant pump 13 for supplying an oxidant with a predetermined pumping power.

The electricity generating element 3 includes a membrane-electrode assembly 17, which oxidizes hydrogen or a fuel and reduces an oxidant, and separators 19 and 19' that are respectively positioned at opposite sides of the membrane-electrode assembly 17 and that supply hydrogen or a fuel, and an oxidant, respectively. The stack 15 is provided by stacking at least one electricity generating element 3.

Hereinafter, the embodiments are illustrated in more detail with reference to examples. However, it is understood that the disclosure is not limited by these examples.

EXAMPLES

Example 1

A Nafion ionomer dispersion solution (Nafion available from DuPont Co., concentration: 5 wt %, solvent: a dispersion liquid of 1-propyl alcohol and water in a volume ratio=50:50) was spray-dried and freeze-dryied, preparing Ionomer powder.

0.86 g of the ionomer powder was dissolved in 7.71 g of dipropylene glycol, and 2 g of a catalyst (Pt/C) powder (Tanaka K.K.) was added thereto and dissolved therein. The solution was agitated to form an ionomer solution including an ionomer cluster. Then, 7.54 g of water was added to the ionomer solution including the catalyst, preparing a catalyst layer composition. Herein, the water and dipropylene glycol were used in a volume ratio of 50:50. The catalyst layer composition includes an ionomer cluster with an average size of 250 nm, which was measured by using a dynamic light scattering spectrometer (DLS) made by Otsuka Electronics Co., Ltd. The method of measuring the average size of the ionomer cluster is well known to those who have an ordinary skill in the art and will not be illustrated in detail.

The catalyst layer composition was coated on a carbon paper (SGL Group The carbon company) as an electrode substrate and sufficiently dried at 80° C. for 3 hours under a vacuum condition of about $10^{-5}$ torr or less, preparing a cathode and an anode including a catalyst layer. At this time, the catalyst layer had an ionomer cluster having a three-dimensional reticular structure and a catalyst adsorbed on the surface of the ionomer cluster. The anode and cathode were used with a hydrocarbon-based polyaryleneether sulfonic acid copolymer polymer membrane (JST 135, JSR Ultrasonics Inc.) as a polymer electrolyte membrane, fabricating a membrane-electrode assembly for a fuel cell.

Example 2

A membrane-electrode assembly for a fuel cell was fabricated according to the same method as Example 1 except for using water and dipropylene glycol in a volume ratio of 40:60 instead of 50:50.

Example 3

A membrane-electrode assembly for a fuel cell was fabricated according to the same method as Example 1 except for using water and dipropylene glycol in a volume ratio of 30:70 instead of 50:50.

Example 4

A membrane-electrode assembly or a fuel cell was fabricated according to the same method as Example 1 except for using water and dipropylene glycol in a volume ratio of 20:80 instead of 50:50.

Comparative Example 1

A membrane-electrode assembly for a fuel cell was fabricated according to the same method as Example 1 except for using a catalyst layer composition prepared in the following method.

The catalyst layer composition was prepared by mixing 2 g of a catalyst (Pt/C) powder (Tanaka K.K.) with a Nation ionomer dispersion solution (Nafion available from (DuPont Co.), concentration: 5 wt %, a solvent: a dispersion liquid of isopropyl alcohol and water in a volume ratio of 50:50) to have an total solid of 30 wt %, adding 232 parts by weight of a mixed solvent of 1-propanol and water based on 100 parts by weight of the catalyst and ionomer mixture thereto to have 10 wt % of a solid, adjust the volume ratio of water and 1-propanol to be 50:50, and mixing them at 6,000 rpm for 10 minutes with a homogenizer.

Comparative Example 2

A membrane-electrode assembly for a fuel cell was fabricated according to the same method as Example 1 except for using a catalyst layer composition prepared in the following method instead of the catalyst layer composition of Example 1.

The catalyst layer composition was prepared by mixing 2 g of a catalyst (Pt/C) powder (Tanaka K.K.) with 17.14 g of a Nafion ionomer dispersion liquid (Nafion available from DuPont Co., concentration: 5 wt %, a solvent: a dispersion liquid of isopropyl alcohol and water in a volume ratio=50:50).

Evaluation 1: Dynamic Optical Scattering Spectrometer (DLS) Measurement

Figure 3:
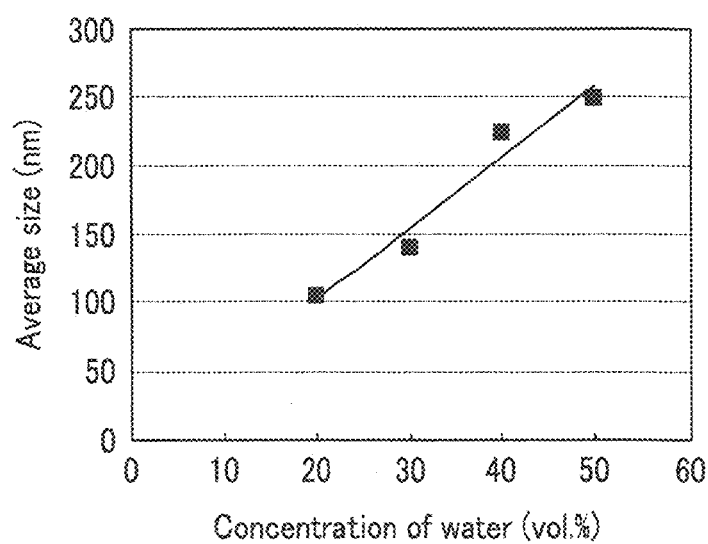
FIG. 3 is a graph showing size change of an ionomer cluster depending on the amount of water in a solvent in each catalyst layer composition according to Examples 1 to 4 of the present invention.

The catalyst layer compositions according to Examples 1 to 4 were measured regarding average size of an ionomer cluster by using a dynamic optical scattering spectrometer (DLS) made by Otsuka Electronics Co., Ltd., and the results are provided in FIG. 3.

FIG. 3 is a graph showing size change of an ionomer cluster depending on water amounts in the catalyst layer compositions according to Examples 1 to 4 of the present invention.

Referring to FIG. 3, an ionomer cluster size was changed depending on the ratio of the water in two component solvent of water and dipropylene glycol. When dipropylene glycol was used alone, an ionomer cluster may have a size of 20 nm and a larger size as water was more included in the total solvent. In particular, the average size of the ionomer cluster was found to linearly increase.

Evaluation 2: Catalyst Layer Surface Comparison

The catalyst layer of each electrode for a fuel cell according to Example 1 and Comparative Example 1 was examined on the surface by using a transmission electron microscope (TEM).

Figure 4:
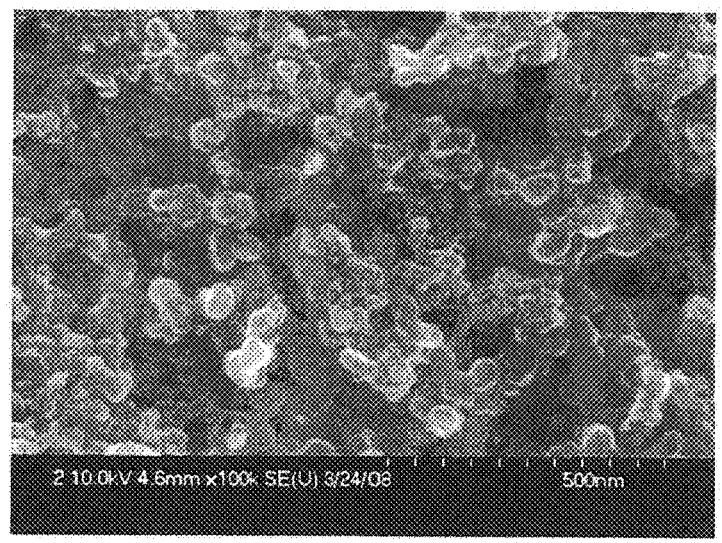
FIG. 4 is a transmission electron microscope photograph of a surface of a catalyst layer in an electrode for a fuel cell according to Example 1 of the present invention.
Figure 5:
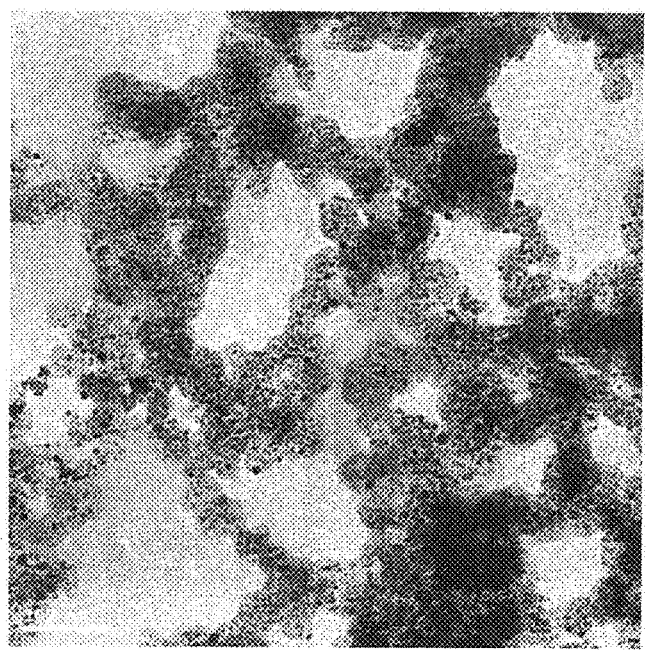
FIG. 5 is a transmission electron microscope photograph of a surface of a catalyst layer in an electrode for a fuel cell according to Example 2 of the present invention.
Figure 6:
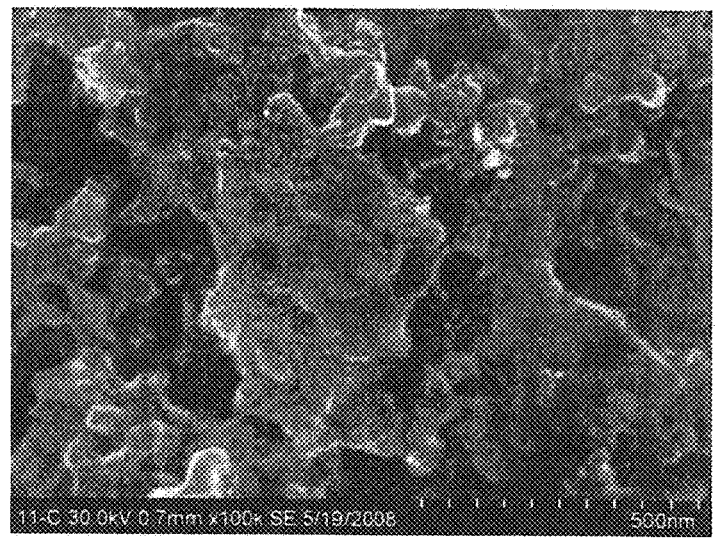
FIG. 6 is a transmission electron microscope photograph of a surface of a catalyst layer in an electrode for a fuel cell according to Comparative Example 1 of the present invention.

FIG. 4 is a transmission electron microscope photograph of a surface of a catalyst layer in an electrode for a fuel cell according to Example 1, FIG. 5 is a transmission electron microscope photograph of a surface of a catalyst layer in an electrode for a fuel cell according to Example 2, and FIG. 6 is a transmission electron microscope photograph of a surface of a catalyst layer in an electrode for a fuel cell according to Comparative Example 1.

Referring to FIGS. 4 to 6, the catalyst layer according to Example 1 was identified to have a three-dimensional reticular structure (a cluster) formed by a ionomer binder, while the catalyst layer according to Comparative Example 1 had an ionomer agglomerate rather than a three-dimensional reticular structure.

According to one embodiment of the present invention, since a catalyst is dispersed on the surface of the ionomer cluster, the ionomer cluster having a three-dimensional reticular structure had an increased surface area and maximized the interface with the catalyst.

Evaluation 3: Catalyst Utilization Rate

In the electrodes according to Example 1 and Comparative Examples 1 and 2, the catalyst layers were measured regarding catalyst utilization rate by using a cyclic-voltammetry (CV) method, and the catalyst utilization rate was calculated in the following equation 1:

A catalyst utilization rate (%)=(electrochemical active area of a Pt catalyst in a membrane-electrode assembly/electrochemical active area of a Pt catalyst in an acid solution)×100     [Equation 1]

In Equation 1,

An electrochemical active area may be calculated by using a hydrogen absorption/desorption area measured in a potential ranging from 0.1V to 0.4V.

The electrochemical active area of a catalyst used in the catalyst utilization rate may be calculated from a hydrogen absorption/desorption area in a 1M sulfuric acid aqueous solution by using an electrochemical evaluation equipment. The active area measured in the acid solution is similar to a theoretically-calculated surface area of a catalyst particle.

Figure 7:
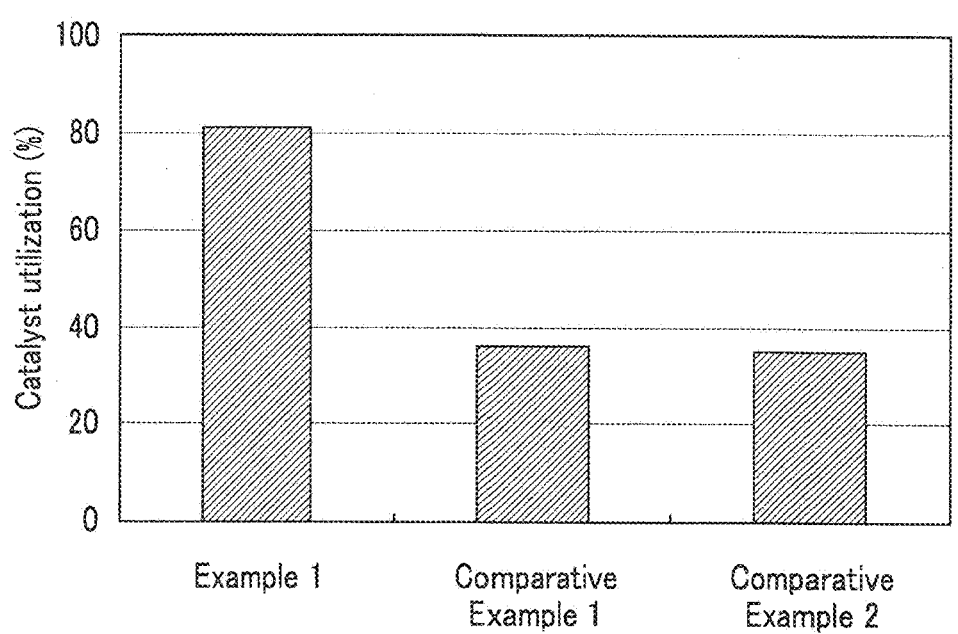
FIG. 7 is a graph showing catalyst utilization rates of catalyst layers in a membrane-electrode assembly according to Example 1 and Comparative Examples 1 and 2 of the present invention.

FIG. 7 is a graph comparing catalyst utilization rates of the membrane-electrode assembly catalyst layers according to Example 1 and Comparative Examples 1 and 2 of the present invention.

As shown in FIG. 7, the electrodes according to Comparative Examples 1 and 2 had a catalyst layer with about 34% of a catalyst utilization rate due to bad dispersion between catalyst particle and ionomer. On the other hand, the catalyst layer according to Example 1 had about 81% of a catalyst utilization rate, which was more than 100% improved compared with the catalyst layers according to Comparative Examples 1 and 2.

Evaluation 4: Performance of Membrane-Electrode assembly (MEA)

The membrane-electrode assemblies according to Example 1 and Comparative Example 1 were measured regarding performance at 0.7V under non-humidifying condition and humidifying condition, respectively. The MEA performance was evaluated at 60° C., and the anode and the cathode were respectively supplied with hydrogen gas and air in a stoichiometry ratio of 0.2 and 2.0 under an atmospheric pressure (1 torr). The non-humidifying condition indicates supply of anode gas with relative humidity of 80% and cathode gas with relative humidity of 10%, while the humidifying condition indicates supply of anode gas with relative humidity of 80% and cathode gas with relative humidity of 80%.

Figure 8:
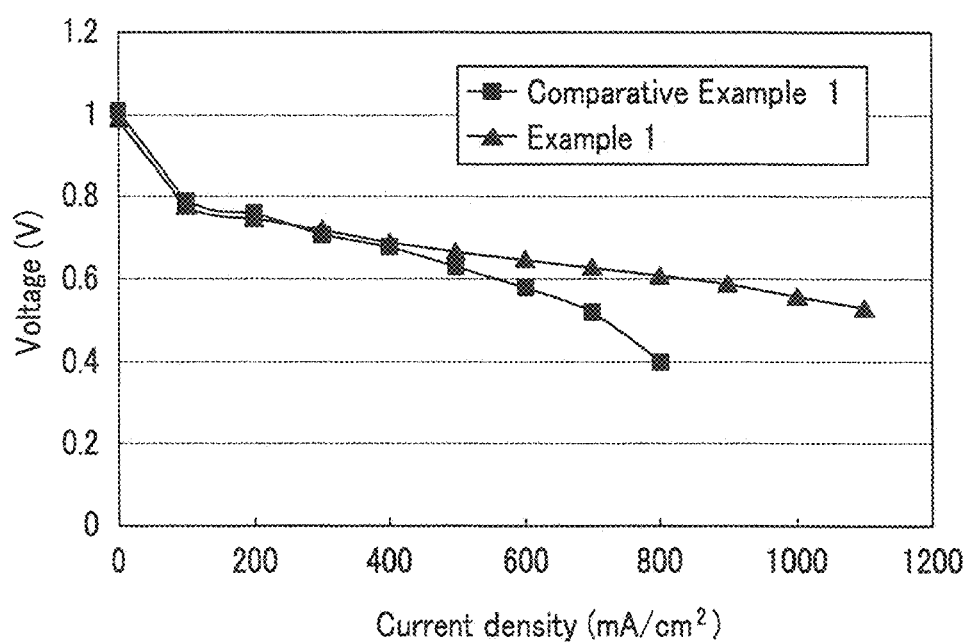
FIG. 8 is a graph showing performance results of membrane-electrode assemblies according to Example 1 and Comparative Example 1 of the present invention by evaluating a fuel cell respectively under a condition of 0.7V under a non-humidifying condition.
Figure 9:
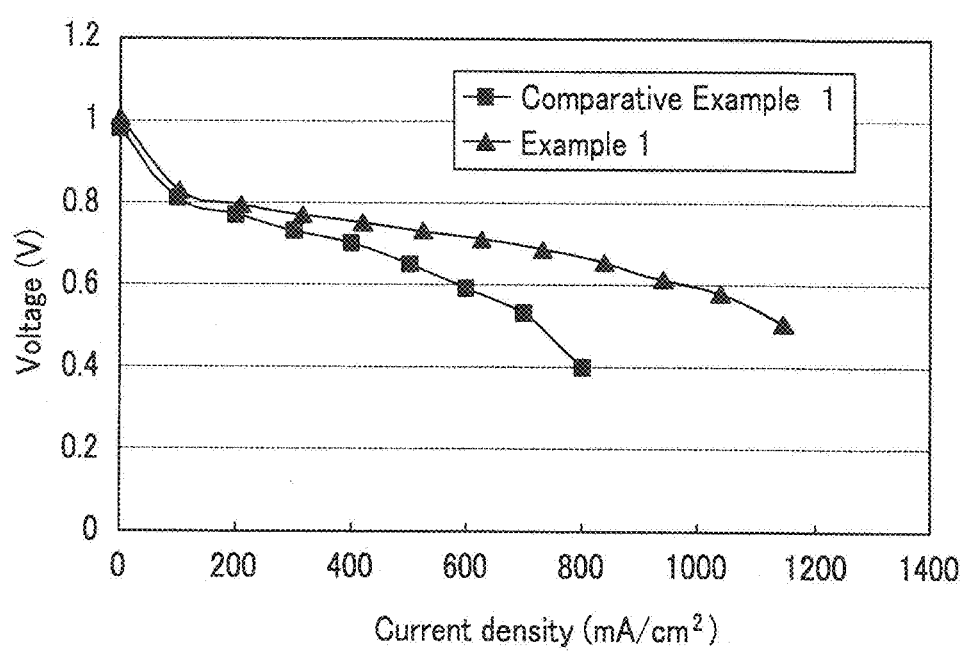
FIG. 9 is a graph showing performance results of membrane-electrode assemblies according to Example 1 and Comparative Example 1 of the present invention by evaluating a fuel cell respectively under a condition of 0.7V under a humidifying condition.

FIG. 8 is a graph showing performance of the membrane-electrode assemblies according to Example 1 and Comparative Example 1 at 0.7V under a non-humidifying condition, and FIG. 9 is a graph showing performance of the membrane-electrode assemblies according to Example 1 and Comparative Example 1 at 0.7V under a humidifying condition.

Referring to FIGS. 8 and 9, the membrane-electrode assembly of Example 1 had an excellent current density at 0.7V of a voltage respectively under a non-humidifying and a humidifying condition compared with the membrane-electrode assembly of Comparative Example 1. The membrane-electrode assembly of Comparative Example 1 had a current density of 325 mA/cm$^2$ under a non-humidifying condition, while the membrane-electrode assembly of Example 1 had a current density of about 340 mA/cm$^2$. Under a humidifying condition, the membrane-electrode assembly of Comparative Example 1 had a current density of about 400 mA/cm$^2$ under a humidifying condition, while the membrane-electrode assembly of Example 1 had a current density of about 680 mA/cm$^2$. Accordingly, the membrane-electrode assembly of Example 1 had improved performance under both of the non-humidifying condition and humidifying condition compared with the membrane-electrode assembly of Comparative Example 1.

While the present invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A catalyst layer composition for a fuel cell, comprising an ionomer cluster;
   a catalyst adsorbed on the surface of the ionomer cluster;
   the ionomer cluster has a three-dimensional reticular structure and a maximized interface with the catalyst and has an average size ranging from about 150 nm to about 250 nm; and
   the catalyst is comprised in an amount ranging from about 125 parts to about 250 parts by weight based on 100 parts by weight of the ionomer cluster.

2. The catalyst layer composition for a fuel cell of claim 1, wherein the ionomer cluster comprises a proton conductive polymer having a cation exchange group selected from a sulfonic acid group, a carboxylic acid group, a phosphoric acid group, a phosphonic acid group and a derivative thereof, at a side chain of the ionomer cluster as a binder.

3. The catalyst layer composition for a fuel cell of claim 2, wherein the proton conductive polymer comprises a fluorine-based polymer, a benzimidazole-based polymer, a polyimide-based polymer, a polyetherimide-based polymer, a polyphenylenesulfide-based polymer, a polysulfone-based polymer, a polyethersulfone-based polymer, a polyetherketone-based polymer, a polyether-etherketone-based polymer, a polyphenylquinoxaline-based polymer, or combinations thereof.

4. The catalyst layer composition for a fuel cell of claim 2, wherein the proton conductive polymer comprises poly (perfluorosulfonic acid); poly(perfluorocarboxylic acid); a copolymer of tetrafluoroethylene having a sulfonic acid group and fluorovinylether; defluorinated polyetherketone sulfide; aryl ketone; poly (2,2'-(m-phenylene)-5,5'-bibenzimidazole); poly (2,5-benzimidazole), or combinations thereof.

5. The catalyst layer composition for a fuel cell of claim 2, wherein hydrogen in the cation exchange group positioned at a side chain of the proton conductive polymer is substituted with Na, K, Li, Cs, or tetrabutylammonium.

6. The catalyst layer composition for a fuel cell of claim 1, wherein the ionomer cluster is used with a non-conductive compound, and the non-conductive compound comprises polytetrafluoroethylene, a tetrafluoroethylene-hexafluoropropylene copolymer, a tetrafluoroethylene-perfluoroalkylvinylether copolymer, an ethylene-tetrafluoroethylene copolymer, an ethylene-chlorotrifluoroethylene copolymer, a polyvinylidenefluoride, polyvinylidenefluoride-hexafluoropropylene copolymer, dodecylbenzenesulfonic acid, sorbitol, or combinations thereof.

7. The catalyst layer composition of claim 1, wherein the polyhydric alcohol comprises $C_1$ to $C_6$ alkane substituted with 2 to 4 hydroxy groups, $C_1$ to $C_6$ haloalkane substituted with 2 to 4 hydroxy groups, or combinations thereof.

8. The catalyst layer composition for a fuel cell of claim 1, wherein the polyhydric alcohol comprises 1,2-ethanediol, 1,2-propanediol, 1,3-propanediol, 3-chloro-1,2-propanediol, 2-chloro-1,3-propanediol, dipropylene glycol, glycerine, or combinations thereof.

9. An electrode for a fuel cell comprising:
an electrode substrate;
a catalyst layer disposed on the electrode substrate; and
wherein the catalyst layer comprises an ionomer cluster having a three-dimensional reticular structure; and a catalyst adsorbed on the surface of the ionomer cluster.

10. A method of fabricating an electrode for a fuel cell comprising:
preparing an ionomer solution by dissolving an ionomer powder in polyhydric alcohol;
adding a catalyst to the ionomer solution;
preparing a catalyst layer composition of claim 1 by adding water to the ionomer solution comprising the catalyst;
coating the catalyst layer composition on an electrode substrate; and
vacuum-drying the coated electrode substrate to form a catalyst layer on the electrode substrate.

11. The method of fabricating an electrode for a fuel cell of claim 10, wherein the water is comprised in an amount of about 20 volume % to about 60 volume % based on the total amount of the water and the polyhydric alcohol.

12. The method of fabricating an electrode for a fuel cell of claim 10, wherein the drying is performed at a temperature ranging from about 50° C. to about 100° C.

13. The method of fabricating an electrode for a fuel cell of claim 10, wherein the drying is performed under a vacuum degree ranging from about 10 torr to about 760 torr.

14. The method of fabricating an electrode for a fuel cell of claim 10, wherein the drying is performed for about 1 hour to about 3 hours.

15. A membrane-electrode assembly for a fuel cell comprising:
an anode and a cathode facing each other;
a polymer electrolyte membrane interposed between the cathode and the anode; and
wherein the cathode and the anode respectively are formed of an electrode for a fuel cell of claim 9.

16. A fuel cell system comprising:
at least one electrical generating element comprising the membrane-electrode assembly for a fuel cell of claim 15;
separators positioned at each side of the membrane-electrode assembly;
a fuel supplier for supplying the fuel to the electrical generating element; and
an oxidant supplier for supplying the oxidant to the electrical generating element.

17. The catalyst layer claim 9, comprising a composition wherein:
the ionomer cluster has an average size ranging from about 100 nm to about 300 nm, and
the ionomer cluster comprises a proton conductive polymer having a cation exchange group selected from a sulfonic acid group, a carboxylic acid group, a phosphoric acid group, a phosphonic acid group and a derivative thereof, at a side chain of the ionomer cluster as a binder.

* * * * *